United States Patent Office 2,970,653
Patented Feb. 7, 1961

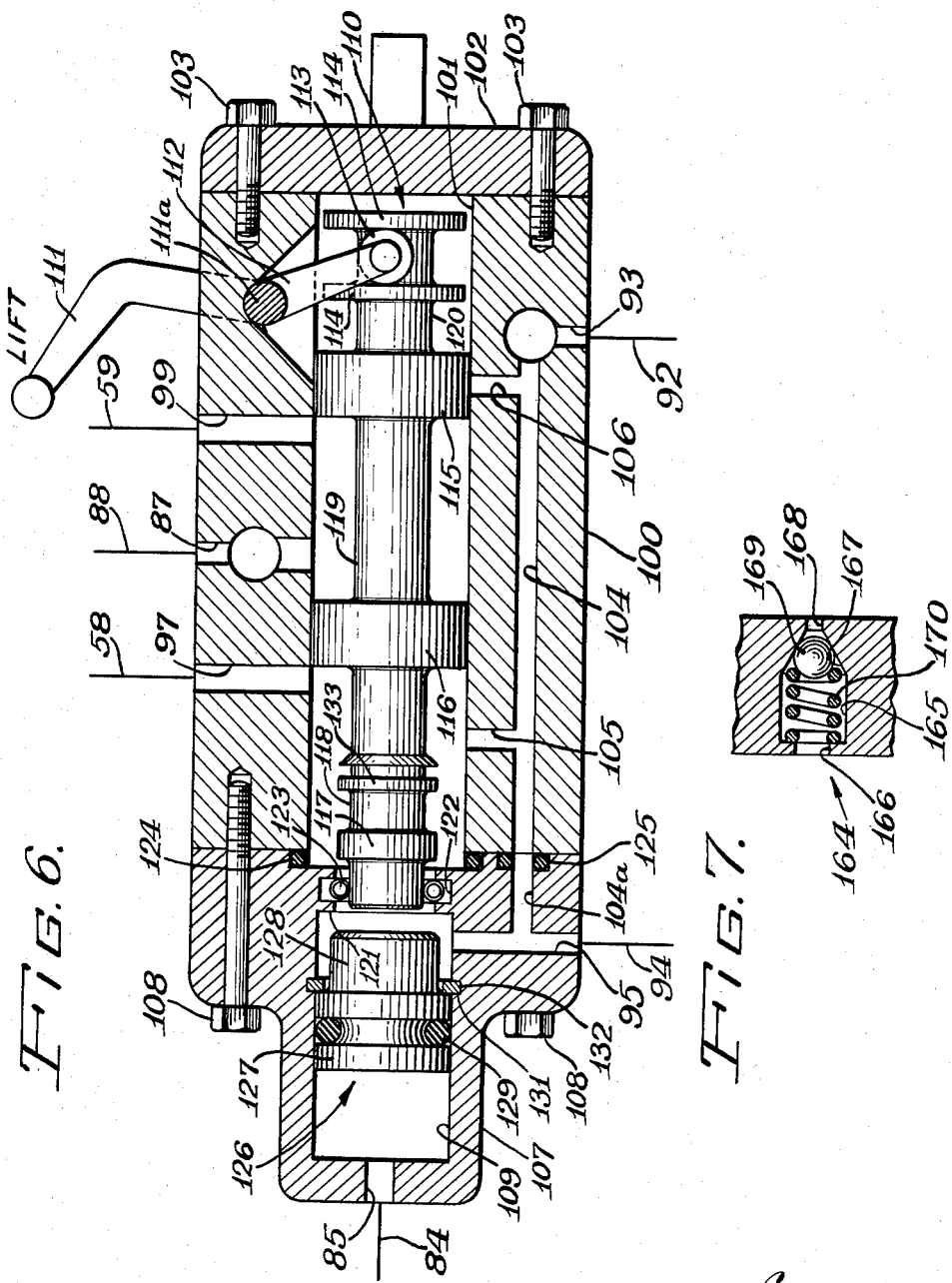

2,970,653

HYDRAULIC DEPTH CONTROL APPARATUS

Gordon L. Hershman, Chicago, Ill., assignor to International Harvester Company, Chicago, Ill., a corporation of Delaware Filed Aug. 6, 1957, Ser. No. 676,683

6 Claims. (Cl. 172—4)

This invention relates generally to agricultural implement attaching mechanisms adapted for attaching earth-working implements to a tractive vehicle such as a tractor, and more particularly is concerned with tractor mounting implement means wherein the implement is carried by the tractor. More specifically, however, the invention is directed to novel depth control apparatus, adaptable for use with the particular implement attaching mechanism envisaged, to provide the vehicle operator with simplified means for locating and controlling the operating positions of the attached implement in the soil being worked. This invention, moreover, is particularly applicable, although not limited thereto, to weight transfer or draft control and implement attaching apparatus for tractors, such as that disclosed in copending U.S. application Serial No. 614,110, filed October 5, 1956 (D-6952), and U.S. application Serial No. 614,305, filed October 5, 1956, now abandoned (D-6965), to which reference may be had for constructional details forming only environment for the invention as claimed herein.

Heretofore devices have been developed for the purpose of controlling depth or of indicating the depth at which an agricultural implement was being worked in the soil, but many of such previous devices either did not provide the control desired or were too complicated and costly to manufacture and merchandise, particularly when utilized with hydraulically operated implement attaching apparatus. In any event, none of the prior devices have proven entirely satisfactory nor have they found any ready acceptance in the industry.

The present invention therefore is directed to the provision of a depth control mechanism that overcomes the objections and handicaps of the prior mechanism utilized for this purpose, and a particular feature thereof is to provide a depth control means that is simple and readily adaptable without appreciable modification to present day production hydraulically actuated implement attaching apparatus.

An important object of the present invention is to provide easily operable and inexpensive means for controlling the depth at which an agricultural implement is worked or operated in the soil.

Another important object is to provide means readily accessible to a vehicle operator for pre-setting the depth at which an implement operated by the vehicle is to be worked in the ground.

A further object is to provide hydraulic control circuit means cooperative with hydraulically operated implement attaching apparatus for limiting the working depth of an attached agricultural implement to a depth predetermined according to a pre-set adjustment by the operator, and wherein the fluid in said control circuit is replenished when required by a flow of fluid from the hydraulically operated implement attaching apparatus.

A still further object is to provide hydraulic depth control mechanism operable responsive to the movement of hydraulically operated implement attaching apparatus and operative for transmitting said movement to a pre-set stop device which when engaged causes a pressure build-up in said mechanism which is effective for unlatching a hydraulic control valve that controls the raising and lowering operation of said implement attaching apparatus.

A more specific object is to provide means readily visible to the vehicle operator for indicating the depth at which an implement operated by said vehicle is being worked in the earth.

Another specific object is to provide depth control apparatus for an implement wherein said apparatus has pre-set stop means to control the working depth of said implement and additional means that permit temporary overriding of said pre-set stop position.

The foregoing and other objects and features of the invention will become apparent as the disclosure is more fully made in the following detailed description of a preferred embodiment of the invention as illustrated in the accompanying sheets of drawings in which.

Figure 3:
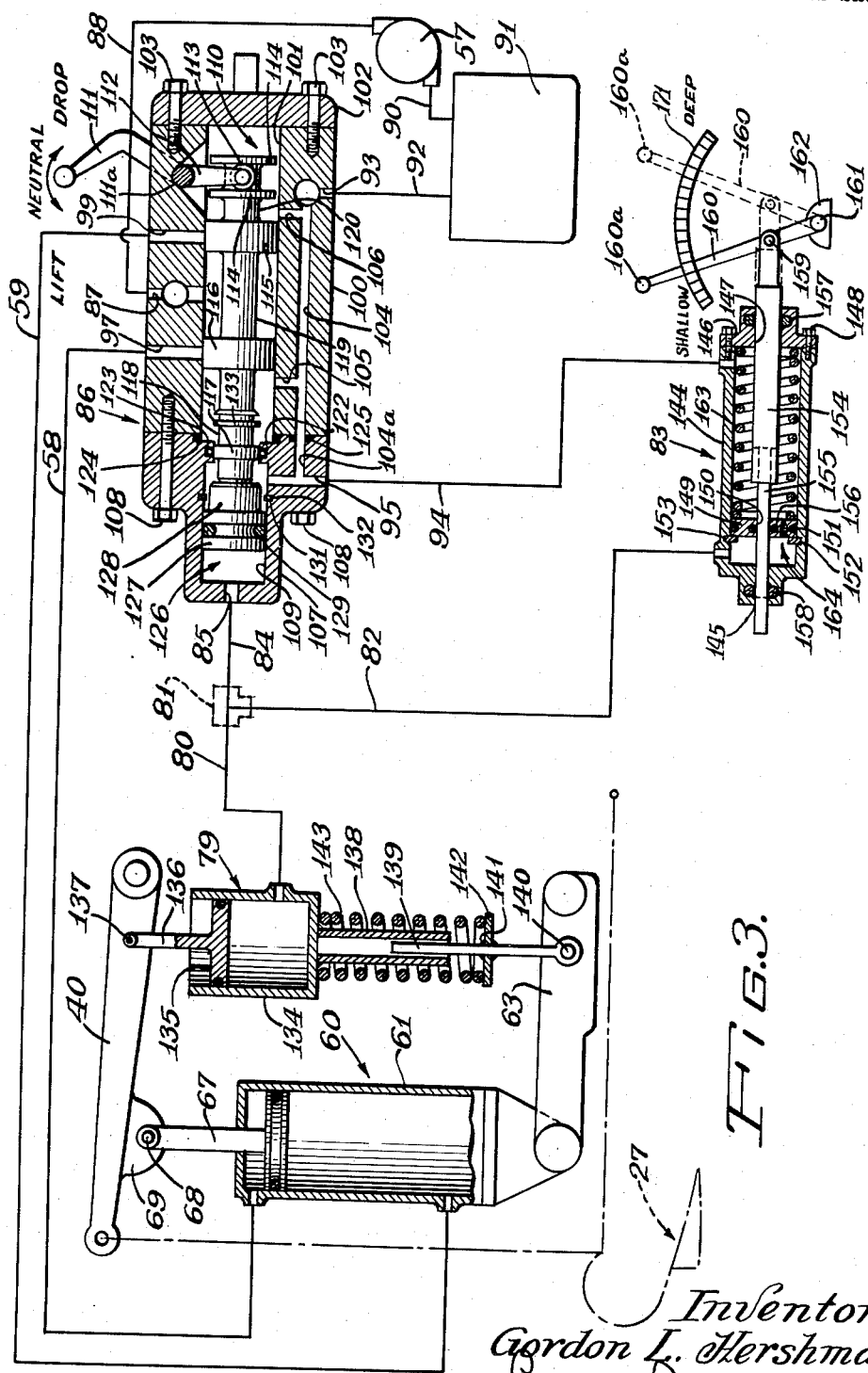
Figure 4:
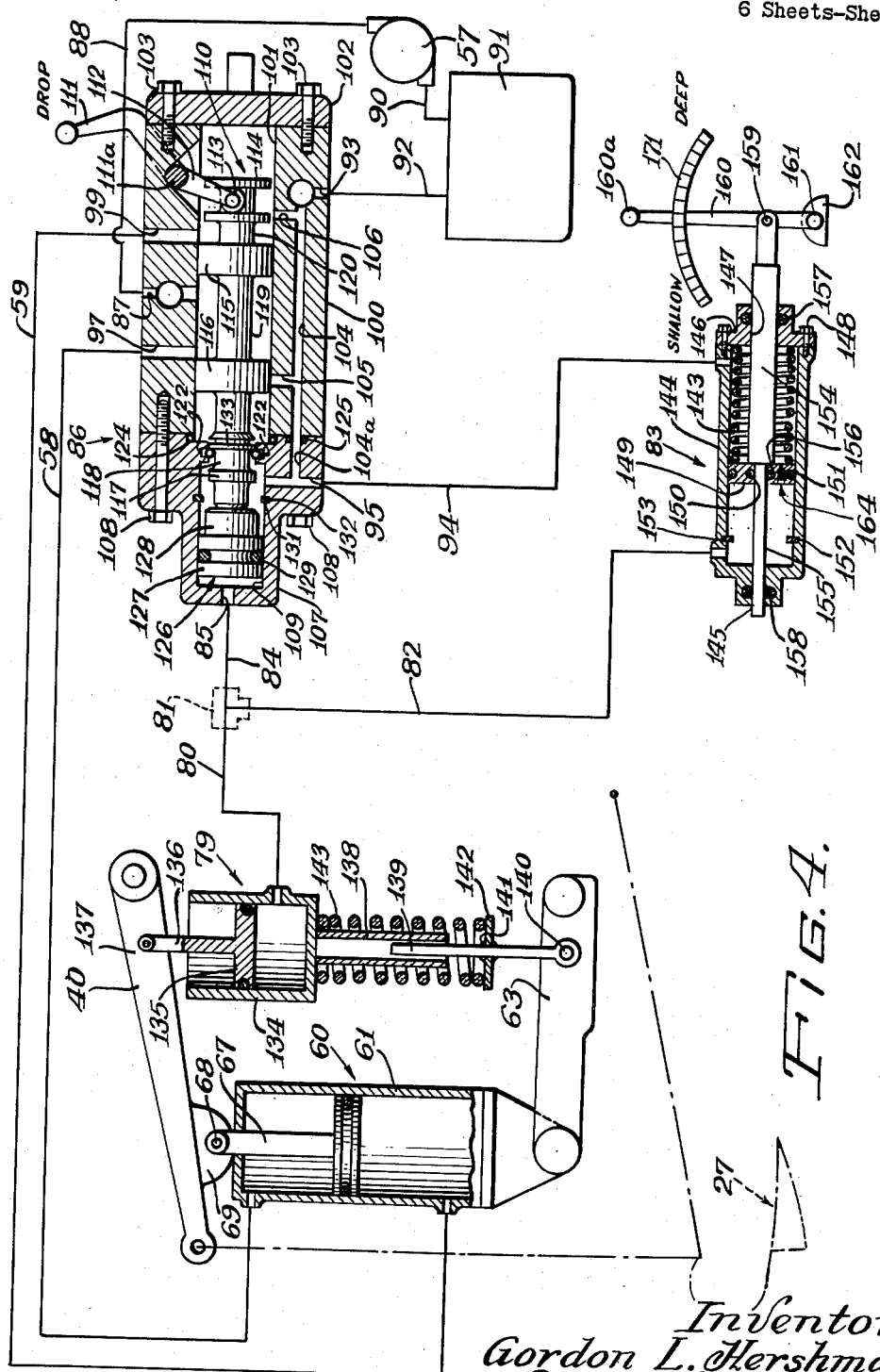
Figure 5:
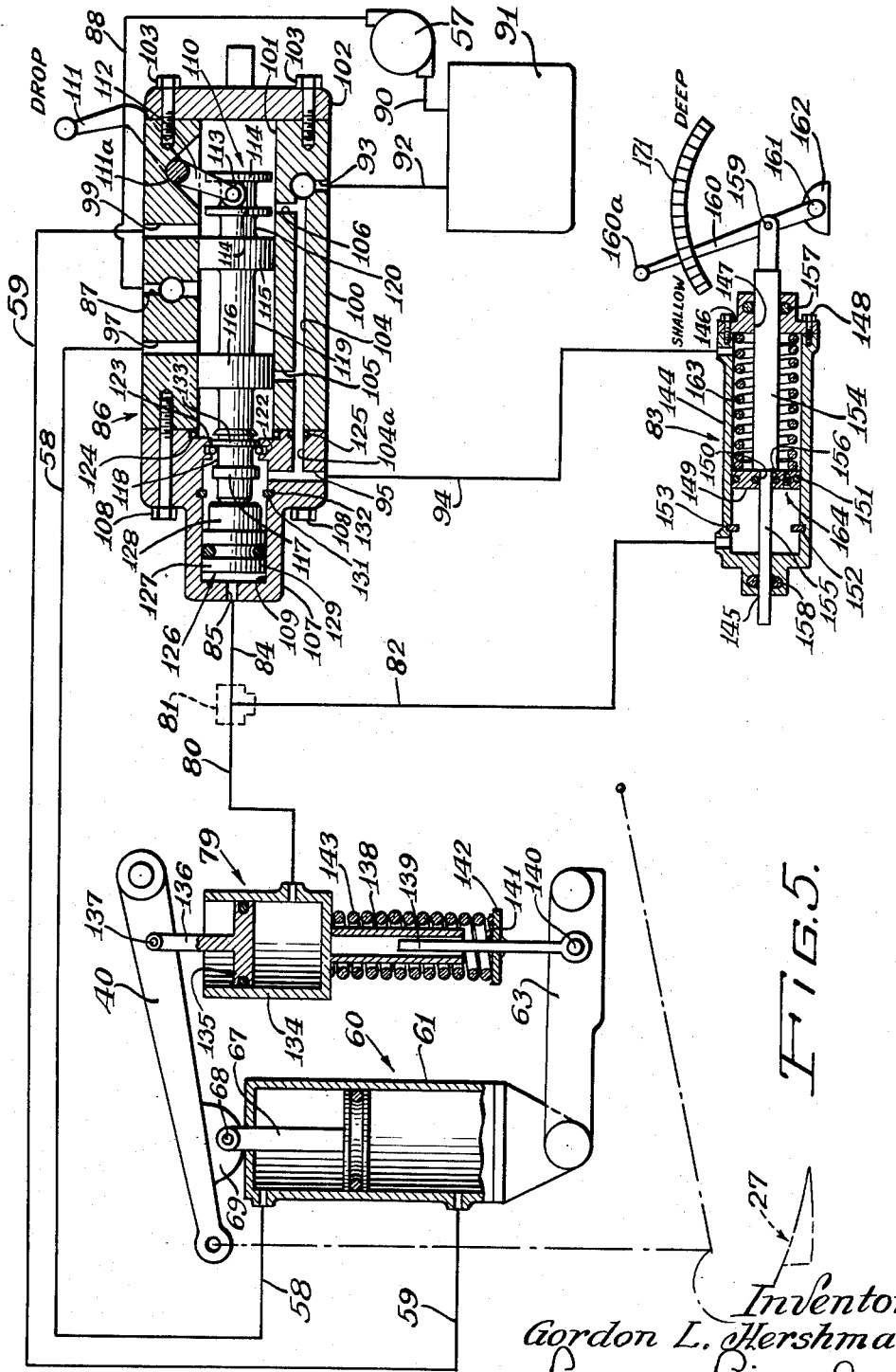

Fig. 3 is a schematic view illustrating the hydraulic control system for the implement attaching apparatus shown in the above views when the implement is in a raised or transport position together with the components of the mechanism incorporating the present invention wherein the control valve thereof is shown in a neutral position, and having said components depicted in longitudinal and vertical sections so as to show more clearly the structural details thereof;

Fig. 4 is a schematic view similar to that of Fig. 3 but showing the attached implement and the control valve in their drop positions, and showing the depth control apparatus pre-set for a medium depth of implement operation;

Fig. 5 is a view similar to those of Figs. 3 and 4 with the attached implement and the control valve in their drop positions, but showing, additionally, the depth control apparatus pre-set for a shallow working position while the overriding feature thereof is operable to accommodate temporary overriding of the depth control mechanism;

Fig. 6 is a longitudinal and vertical sectional view, in enlarged dimensions, of the hydraulic control valve shown in Figs. 3-5 but showing said valve in the position assumed when the system is conditioned for lifting or raising the attached implement; and Fig. 7 is a fragmentary sectional view, in enlarged dimensions, of the check-feeder valve incorporated as a portion of the metering cylinder forming an element of the depth control apparatus depicted in Figs. 3-5.

Reference now to the drawings will disclose that the implement attaching apparatus selected for depicting a preferred application of an arrangement incorporating therein the features of the present invention is shown in association with a tractor vehicle, but, since a conventional tractor has been utilized, only the pertinent components thereof are shown in the drawings. The vehicle illustrated is shown primarily as one having a generally conventional longitudinally extending body 10 rear axle structure 11 and a pair of laterally spaced rear drive wheels 12 (only one of which is shown).

An articulated draft member or drawbar 13, as illustrated, may include a forward bail-like section 14 having laterally spaced forwardly converging arms 15 and 16 connected by a cross brace 17.

The forwardmost ends of arms 15 and 16 which may be parallel are apertured to receive pins 18 universally pivoted in the lower end of a hitch arm 19 affixed, as by welding, to a transverse shaft 20, in turn, rotatably supported at opposite ends thereof in a bracket 21 affixed to the body 10 of the tractor and projecting downwardly therefrom. The drawbar or draft member 13 is thus connected in draft receiving relation to the tractor through hitch arm 19, and by means accommodating longitudinal movement of the draft member, by virtue of the fact that the shaft 20 is rotatably carried between the legs of the bracket 21, causing arm 19 to swing about the axis thereof in a longitudinal direction.

Draft member 13 may additionally include an articulated rear section in the form of laterally spaced longitudinally elongated socket members 22 and 23 pivotally connected by transversely extending pivot pins 24 to arms 15 and 16, respectively. The rear end of each of said arms may be bent upwardly to form an extension, such as 25, that functions as a stop by engaging the upper portion of the socket member associated therewith to limit the downward swing about the axis of the pins 24 of the socket member with respect to the bail 14.

The socket members 22 and 23 are adapted to slidably receive the laterally spaced complementary longitudinally elongated attaching prongs 26, only one of which is shown, of an earth-working implement, such as the moldboard plow indicated generally by the reference numeral 27, and each of said sockets is provided with a base in the form of a bar 28 affixed thereto which terminates short of the forward end of the associated socket member and forms a support for the lower surface of said shaft member. The forward end of each of the prongs 26 is usually tapered and beveled while the base 28 extends forwardly and upwardly from the rear end of said socket member to conform to the taper of the lower surface of prong 26, and both said base and prong terminate short of the forward end of said socket member to avoid engagement with extension 25 of the forward bail section 14.

Each of said socket members may be notched as indicated at 29 to register with a complementary groove or notch (not shown) in each of the prongs 26 while a latch 30 is also provided. As shown (Fig. 1) the prongs 26 are in locked position and thus constrained against longitudinal displacement in the respective sockets and the implement 27 is positioned so that a portion thereof is in the ground being worked. Latch member 30 has laterally projecting trunnions 31 rockably received in a groove 32 in the associated socket member and secured thereto via projections 33 engaged by a leaf spring 34 fixed to said socket member and operative to hold said latch in a locking position. To release the latch it is simply rocked rearwardly about the axis of the trunnions 31.

Vertical movement of the draft member 13 may be accomplished by lift means on the tractor and such means includes a transversely extending rockshaft 35 rotatably mounted in bearings 36 and 37 at the upper ends of brackets 38 and 39 affixed to opposite sides of the tractor body. Lift arms 40 and 41 which are affixed to opposite ends of shaft 35 and extend rearwardly therefrom are bifurcated for pivotal connection to the upper ends of a pair of lift links 42 and 43. Left-hand link 42 comprises a shaft portion 44 slidably receivable in a sleeve member 45 having a lower clevis portion 46 providing a slot for the sliding reception of a cross-head 47 on the lower end of shaft 44 to prevent its displacement from sleeve 45 while accommodating sliding movement thereof in said clevis. The lower end of clevis 46 is mounted upon a pivot pin 48 carried by a pair of lugs 49 affixed to and projecting upward from a respective socket member 22.

Lift arm 41 is pivotally connected by its bifurcation to a swivel 50 in which is rotatably received a rod 51 threaded for reception in a sleeve 52, the lower end of which is pivotally mounted upon a pin 53 carried between a pair of upwardly projecting lugs 54 affixed to socket 23. Suitable collars may be provided on rod 51 above and below said swivel, while the lower collar may, if desired, be adjusted downwardly on the rod to accommodate limited telescoping action between said rod and swivel. At the upper end of rod 51 there is provided a handle 55 for adjusting the length of the lifting link 43 thereby laterally levelling the draft member 13 about a longitudinal axis to effect levelling of the attached implement and adjusting the relative vertical positions of the socket members 22 and 23. When certain types of implements are mounted on the tractor, it is desirable that the draft structure 13 be allowed to float freely in a vertical plane about the axis of the pins 18 and their universal connection with the hitch arm 19, and this may be accomplished through telescoping of the links 42 and 43. However, in the case of a moldboard plow, such as that illustrated herein, it is desirable that it be held against tilting about a longitudinal axis so that the levelling adjustment selected can be maintained, and this is accomplished by means of a pin 56 passed through a suitable opening provided in clevis 46 and adapted to engage the lower surface of cross-head 47.

Figure 1:
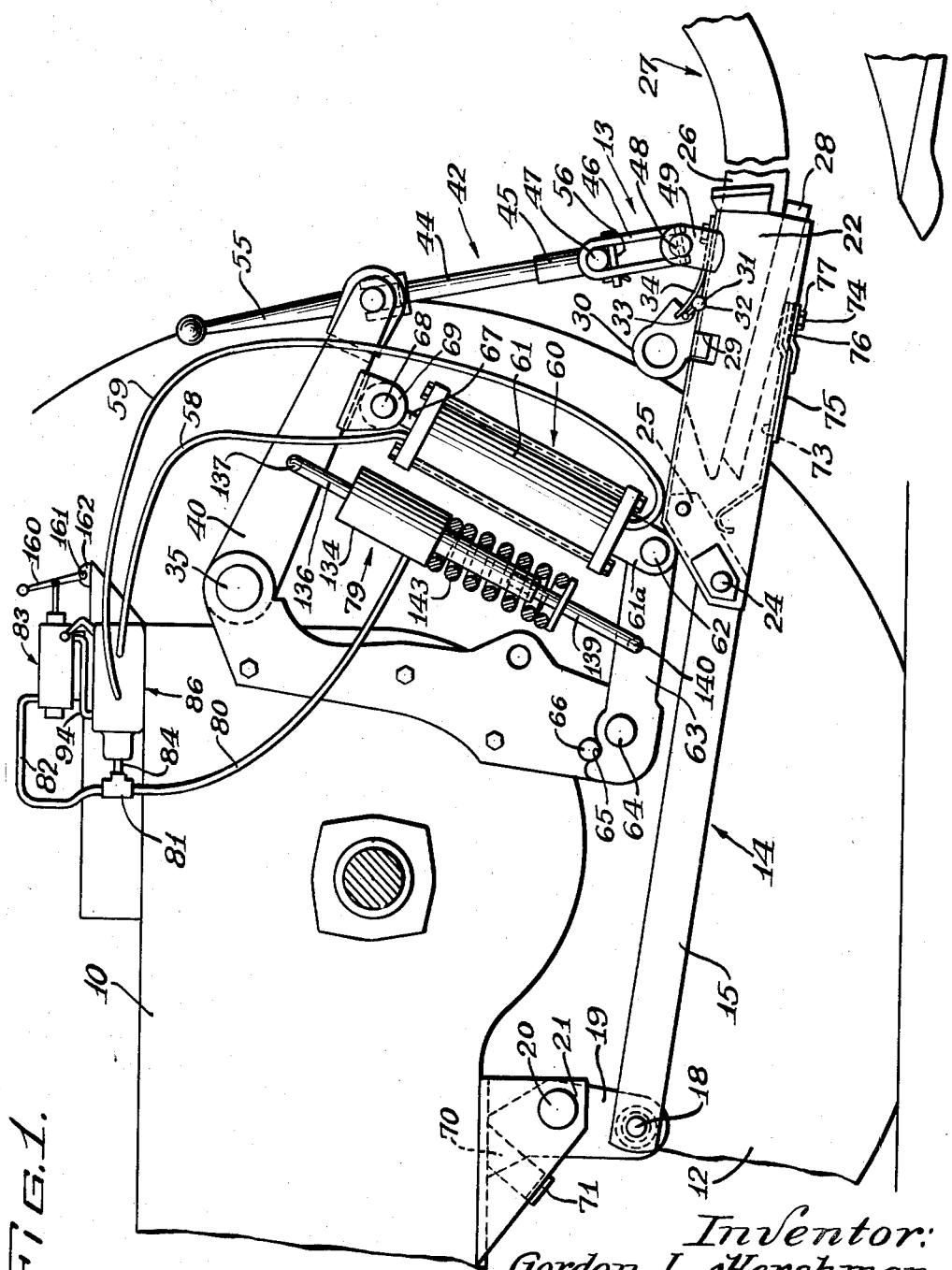
Fig. 1 is a view in side elevation of a portion of the rear end of a tractor, with one wheel removed, showing implement attaching apparatus incorporating features of the present invention and having a moldboard plow connected thereto, the implement and its attaching apparatus being shown in a lowered or operating position.

Raising and lowering of draft structure 13 to vertically move the implement connected thereto between operating and transport positions, or to adjust the depth of the implement's operation, may be effected by means of power derived from the tractor power plant and transmitted by means of fluid under pressure supplied from a pump 57, and delivered by way of a control valve and through conduits 58 and 59 to a conventional hydraulic ram or hydraulic motor 60. Said ram may include a cylinder 61 receiving fluid under pressure through the conduits 58 and 59, and having at its lower end a clevis 61a anchored to a pivot pin 62 carried at the end of an arm 63 fulcrumed upon a pivot pin 64 carried at the lower end of bracket 38. The rearward edge of arm 63 is curved to form a recess 65 that disengageably receives a stud-like pin 66 affixed to bracket 38 and thus restricts the downward movement of arm 63 about pin 64. Admission of fluid under pressure to one end of the cylinder 61, in the position of the parts indicated in Fig. 1, extends piston rod 67 which is pivotally mounted upon a pin 68 carried between a pair of lugs 69 affixed to lift arm 40. Extension of the piston rod in the cylinder moves the implement attaching apparatus and therefore its connected implement from a lowered position, such as indicated in Fig. 1, to that of the transport position such as is represented in Fig. 3.

Rearward swinging of the hitch arm 19 and therefore rearward movement of the implement relative to the tractor under the influence of excessive draft forces may be limited by the provision of a bumper stop in the form of an upwardly projecting extension 70 on arm 19 engageable with the transverse portion 71 of a yoke 72 affixed to a transverse portion (not shown) of bracket 21.

Sockets 22 and 23 are biased to a position in general alignment with the arms 15 and 16 of the forward or bail section 14 by the provision of a leaf spring 73 which has an offset section 74 engaging the under surface of bar 28 and held in place by a pair of spring sections 75 and 76 secured to spring 73 and base 28 by a bolt 77, the forward end of spring 73 being bent upwardly to engage extension 25. Thus, when the implement is detached from the tractor and the operator wishes to back the tractor to the implement and cause the socket members 22 and 23 to slidably receive the prongs 26 of the implement, he elevates the sockets by actuation of ram 60 to the proper elevation to receive the prongs and the springs 73 offset the tendency of the sockets to pivot about the axes of the pins 24, so that the sockets can be brought into a position which facilitates reception of the complementary prongs on the implement.

Figure 2:
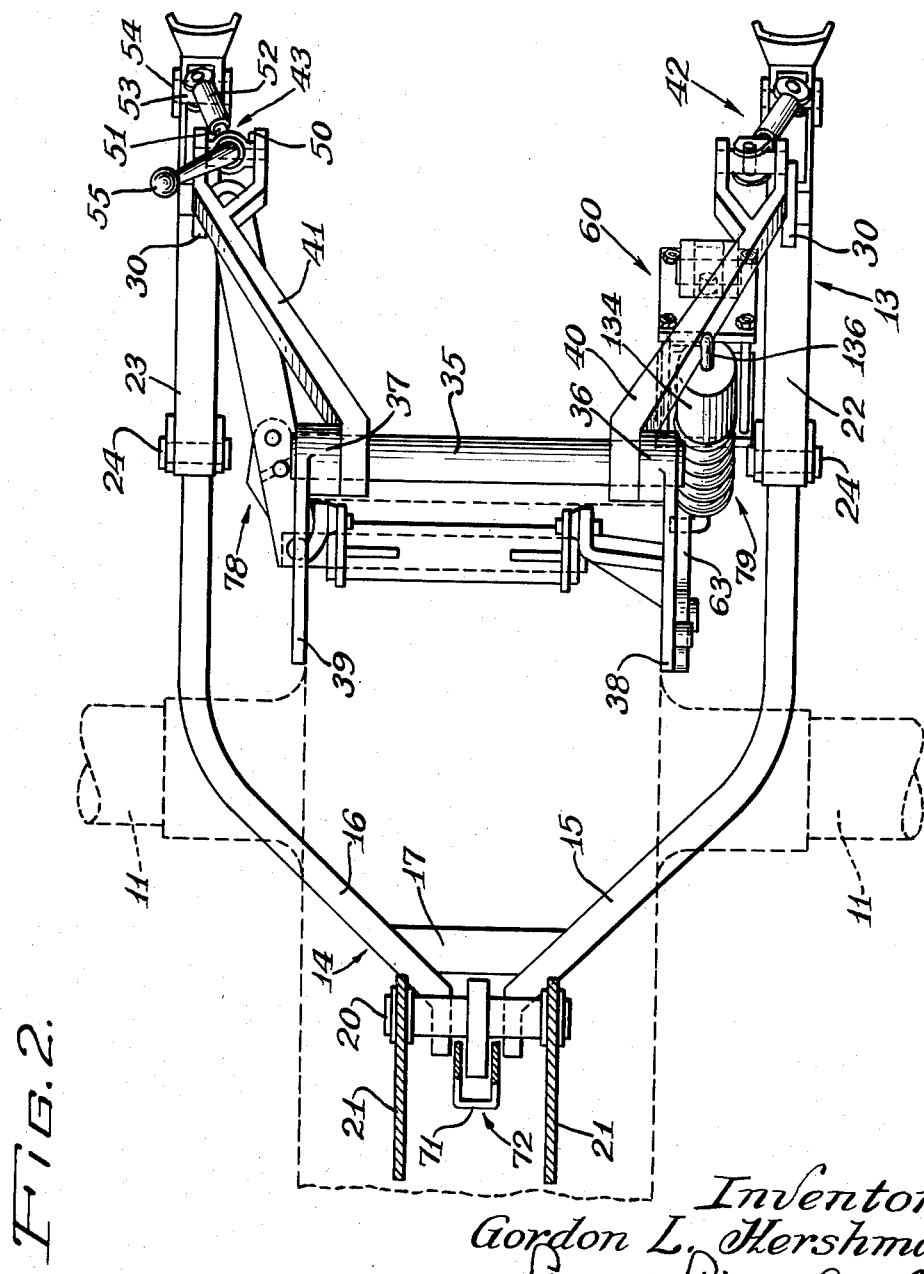
Fig. 2 is a plan view, partly in section, of the implement attaching apparatus incorporating the invention, with the position of the tractor indicated in broken lines.

Limitation of lateral swinging of the implement attaching structure and the implement relative to the tractor may be provided by stabilizing means generally indicated at 78 (Fig. 2), forming no part of the present invention, and described more particularly in the first of the copending applications referred to above.

Now in accordance with the more specific teachings of the present invention there is provided a readily operable hydraulical means for controlling the depth of operation of the plow or other implement in the soil, together with means for manifesting or indicating to the vehicle operator the relative depth at which said implement is being operated.

The proposed depth control apparatus is associated, preferably, with the implement attaching means of the vehicle and cooperates with the lift mechanism thereof to effect depth control of an attached implement. The proposed control apparatus includes a hydraulic ram or hydraulic cylinder unit 79 operatively connected between the arm 63 and the lift arm 40 of the implement attaching mechanism and is adapted to control relative movement in one direction between said arms. The cylinder 79 thereof is connected by a fluid carrying conduit 80 to a "T" connection 81 which has a branch conduit 82 that connects with one end of a metering cylinder 83, and another branch 84 that opens into a port 85 at one end of a hydraulic control valve, indicated generally at 86, in turn, connected through a port 87 and a pressure supply line conduit 88 to the discharge side of the generally conventional pump 57 operatively connected through suitable well known drive means (not shown) to the vehicle's engine or power-plant (not shown). The return side of said pump is connected by a conduit 90 to a suitable fluid reservoir 91 while a return conduit 92 connects said reservoir with a return port 93 in the valve 86, and a conduit 94 connects the return pressure port 95 in said valve with the opposite end of metering cylinder 83. A conduit 58 connects the work port 97 of valve 86 with the upper end of hydraulic ram cylinder 61 while another conduit 59 connects the work port 99 of said valve with the lower or opposite end of ram cylinder 61.

The valve 86 illustrated herein represents a simplified and slightly modified version of the valve more particularly described in co-pending U.S. application, Serial No. 526,050, filed Aug. 2, 1955, now U.S. Patent No. 2,836,195, but, since some of the features thereof form no part of the present invention, it was felt desirable to eliminate all unnecessary and not specifically pertinent structural details so as to permit simplifying the drawings and description of the present invention. Said control valve in its simplified form is fashioned with a casing 100 (Fig. 6) having a central longitudinally extending bore 101 therethrough and one end of said bore is closed by a cap or cover 102 suitably secured thereto by the cap screws 103. The ports 87, 97 and 99 pass through the casing 100 and extend into the central bore 101, while port 93 opens into one end of a longitudinally extending passage 104 which is connected with the bore 101 by radially disposed and longitudinally spaced passages 105 and 106. A cap-like extension or cover 107 is positioned over the opposite end of casing 100 and may be secured thereto by suitable means such as the cap screws 108. This latter extension member is provided with a central axially extending bore-like recess 109 of slightly less diameter than bore 101 and is axially aligned therewith to provide an extension thereof while the closed end of said recess includes the port passage 85. The passage 104 aligns with an extension 104a in cap 107 and opens into the port passage 95 which extends into the bore recess 109.

Slidably disposed within the bore 101 and extending into the bore recess 109 is a spool, indicated generally by the numeral 110, which is axially slidable and adapted for manual movement by means of an actuating lever 111. The lever 111 is rotatably mounted by a pin or stud 111a in the casing 100 and secured to said pin for rotation therewith is an operating fork 112 having a collar-like button 113 on the opposite end thereof that rides between a pair of axially spaced flanges 114, 114 affixed to one end of spool 110. Longitudinally spaced on the spool are two lands 115 and 116, while a third land 117 of somewhat smaller diameter is disposed proximate one end of said spool. Reduced area portions fashioned between said lands provide annular grooves 118 and 119 while a reduced area between the land 115 and the proximate flange 114 provides an additional annular groove 120.

A radial inwardly extending annular flange 121 at the open end of bore recess 109, in cap 107, is provided with an annular recess or groove 122 that receives a garter springs 123, indicated as circumscribing the land 117 on spool 110 (Fig. 3). Suitable liquid sealing means such as the ring 124 is provided at the juncture of casing 100 and cap 107, while a similar ring 125 is also provided at the juncture of passages 104 and 104a. Mounted within the bore-recess 109 and adapted for axially slidable movement therewithin is an unlatching piston 126. Said piston is fashioned with a main body portion 127 from which axially extends a smaller diameter extension portion 128 while a liquid sealing piston ring 129 is positioned in an annular recess 130 in said main body portion. An annularly extending and radially disposed stop ring 131 suitably secured in an annular recess 132 in the bore-recess 109 operates to limit axial travel of the piston 126 in one direction, as will be readily seen by reference to Figs. 3–6 of the drawings. A stop ring 133 on spool 110 is positioned to abuttingly engage the detent garter spring 123 and limit axial travel of said spool, when the spool moves to the left as viewed in Figs. 4 and 5 hereof.

The hydraulic ram 79, which may be termed a depth transmitting cylinder, is fashioned as a cylindrical casing or housing 134 having one end thereof open and having a piston 135 slidably positioned therewithin. A piston rod 136 projecting from one face of said piston is pivotally connected, by suitable means such as the pin 137, to the lift arm 40 and is adapted for movement therewith. Projecting from the closed end wall of said cylinder and fixedly secured thereto is a hollow tube or pipe-like member 138 having its opposite end open and positioned to receive in slidable relation therewithin a rod-like post or pillar 139, the opposite end of which is pivotally connected, by suitable means such as the pin 140, to the rockable arm 63 which supports the ram 60. Fixedly positioned on the rod 139, by suitable means such as the welds indicated at 141, is a platform 142 that seats one end of an over-riding coil spring 143 while the opposite end of said spring abuts and is compressed against the outer surface of the end wall of the cylinder 134.

The metering cylinder 83 may be fashioned as a cylindrical casing 144 having one end thereof open while the closed end is provided with a centrally disposed aperture 145. The open end of said cylinder is closed with a lid-like cap or cover 146, having a centrally disposed aperture 147 and said cap may be removably secured in position by suitable means such as the cap screws 148. Positioned within the cylinder casing 144 is a piston member 149 having a centrally disposed aperture 150 therein which is in alignment with the aperture 145 in the end wall of said cylinder. A conventional liquid sealing piston ring 151 may be provided, as indicated, recessed in the peripheral surface of the piston 149, while disposed in an annular recess 152 in the inner surface of the cylinder casing 144 is a snap ring 153 that is positioned to function as a stop ring or abutment for said piston so as to limit axial movement thereof in one direction. An actuating member, which may be fashioned as a rod 154 having a reduced diameter portion 155 at one end thereof, is positioned to extend through the aligned openings 145, 150 and 147 and is adapted for slidable movement therethrough. A liquid seal ring assembly 156 is mounted in the aperture 150 while a liquid seal ring assembly 157 mounted on the lid 146 slidably receives one end of rod 154 and another liquid seal ring assembly 158 mounted on the end wall of the casing at the opposite end of the cylinder 144 receives the opposite or reduced end portion 155 of said rod. The extending end of rod 154 is pivotally connected by a pin 159 to a control handle or lever 160 that has one end thereof pivotally mounted with a conventional friction disc 161 to a bracket or mounting support 162 that, in turn, is suitably affixed to the tractor vehicle frame 10 at a location convenient to the vehicle operator and the free end of said lever may be provided with a ball-like element 160a to facilitate grasping thereof by the operator. A coil spring 163 is reactively disposed between one face of the piston 149 and the inner surface of the cover member 146 so as to bias said piston toward the opposite end of the cylinder when pressure is removed therefrom. A feeder valve in the form of a one-way check valve 164 is provided in the piston 149 for purposes which will subsequently be explained. A recess 165 in said piston opens at one end through an aperture 166 into one end of cylinder 144 while a cone-shaped seat 167 connects the opposite end of said recess with an aperture 168 that opens into the other end of said cylinder, and a ball member 169 rides resiliently positioned against said seat by means of a coil-spring 170 disposed in said recess.

Operation

The operation of the proposed device is, of course, closely related to that of the implement attaching apparatus and is best described in connection therewith. The drawbar or draft member 13 being connected by lift links 42 and 43 and lift arms 40 and 41 to rockshaft 35 is raised and lowered by the extension or contraction of the double-acting hydraulic ram 60 which is connected between the lift arm 40 and the rockable arm 63 of said apparatus. As illustrated in Fig. 3 with the ram cylinder 60 extended the draft member 13 will ordinarily be in the raised or transport position and the valve 86 will be in a neutral position. In such neutral position the ports 97 and 99 are sealed or closed by the lands 116 and 115, respectively, of the spool 110 and hence the fluid in the cylinder 61 and the connecting conduit lines 58 and 59 is locked against flow in either direction and the piston of said ram cylinder is immobilized. When the spool of the valve 86 is so positioned the detent garter spring 123 rides the surface of the land 117 of said spool and thus fixedly positions the spool against accidental longitudinal movement.

In order to lower the attached implement from its raised or carrying position the actuating lever 111, of valve 86, is rotated clockwise, or to the right as viewed in Fig. 3, whereupon, through the rotation of associated fork 112, the spool 110 is slidably moved axially, to the left as shown in Figs. 4 and 5, until land 115 clears port passage 99 and land 116 clears port passage 97 while the detent garter spring 123 contracting engages the groove portion 118 and also eventually abuts the adjoining stop ring 133 of said spool. At this time fluid becomes free to flow from the pump 57 through conduit 88 and port 87 into the annular area of the groove 119 of the spool 110 and out through port passage 97 and conduit 58 into the upper part of ram cylinder 61 to force the piston thereof downward carrying with it the lift arm 40, and hence any attached implement as seen in Figure 4. Simultaneously with the downward movement of the piston in ram cylinder 61 the fluid in the opposite or lower end of said cylinder is forced out through conduit 59 and port passage 99 into the open area adjoining the groove 120 of the spool 110 and thence through the port passage 106, longitudinal passage 104, port passage 93 and conduit line 92 back into the fluid reservoir 91.

In order to raise or lift the attached implement from a lowered position the handle or lever 111 is rotated counterclockwise, or to the left in Fig. 3, whereupon, through the rotation of fork 112, the spool 110 is moved axially to the right past its neutral position until land 115 clears port passage 99 and land 116 clears port passage 97 while the detent garter spring 123 rides over the land 117 and again contracts and then engages the axial extension of spool 110. In this position (Fig. 6) the valve is conditioned to direct fluid from the pump 57 through conduit 88 and port passage 87 into the annular area adjoining groove 119 and then, through port passage 99 and conduit 59 into the lower end of ram cylinder 61 to raise or extend the piston thereof, and with it raise the lift arm 40 and the implement attached thereto. Incident to the upward movement of the piston in ram cylinder 61 the fluid in the upper portion of said cylinder is forced through conduit 58 and port passage 97 into the annular area adjoining groove 118 of the spool 110, and thence through port passage 105, longitudinal passage 104, and port passage 93 and conduit 92 back into the reservoir 91. When the implement has been raised or lowered to the desired position the handle 111 of the valve 86 will generally be rotated to bring the spool back to a neutral position, thus locking the piston in the ram cylinder 61 in the position then attained.

In order to utilize the depth control apparatus, which forms a particular feature of the present invention, the depth control handle 160a is moved to the position on the quadrant scale 171 corresponding with the depth in the soil it is desired to operate the attached implement. It will be understood, of course, that said quadrant scale may be graduated or calibrated to indicate relative depths or positions or any similar factor desired and that the specific markings indicated thereon may vary from time to time without affecting any of the teachings of the invention. Assume, first, for purpose of explanation, it is desired to operate the attached implement at a shallow depth, whereupon, the handle 160a is rotated counterclockwise, or to the left as seen in Fig. 3, against the reaction of friction disc 161 and carrying with it the attached rod 154. Next the lever 111, of valve 86, is rotated clockwise to drop the implement, as previously described, which action results in the cylinder 60 being retracted and the lift arms 40 and 41 being lowered and, since piston rod 136, of the depth transmitting cylinder 79, is attached to the arm 40 the piston 135 is correspondingly lowered. As said latter piston is lowered hydraulic fluid is displaced from said depth transmitting cylinder 79 and directed under pressure into conduit 80 from whence a portion flows by way of conduit 84 and port passage 85 into the bore-recess 109 behind unlatching piston 126, in valve 86, while the remainder passes by way of conduit 82 into the metering cylinder 83. The fluid thus flowing into this latter cylinder will operate to move the piston 149 therein from its spring-loaded position, indicated in Fig. 3, axially to the right until it engages the pre-set stop fashioned by the rod 154 corresponding to the position thereof represented in Fig. 5. When the measuring piston 149 stops moving after encountering stop rod 154 pressure in the system therebehind builds up instantaneously to an amount that is sufficient to react against the unlatching piston 126 and forcibly release the garter spring 123 from the detent 118 in control valve 86 thereby permitting the valve spool 110 to be returned to its neutral position, whereupon the flow of hydraulic pressure to hydraulic ram 60 is discontinued and said ram is locked against further movement.

In the event additional depth is temporarily or momentarily required for any reason the lever 111, of valve 86, can be manually forced into its drop position against the reaction of unlatching piston 126, whereupon the lift arm 40 will, of course, follow the movement of ram 60 and lower the attached implement. When this occurs the depth transmitting cylinder 79 together with its piston 135 and rod 136 will then act substantially as a rigid thrust rod or member forcing the override spring 143 to compress against the abuttment platform 142 and thus permit the temporary or momentary further lowering of the implement as indicated in Fig. 5. Since the area of the unlatching piston 126 is small by comparison to the area of the piston 135, in cylinder 134, it will be appreciated that any movement of the unlatching piston will cause only a relatively small movement of the piston 126 in said cylinder and the fluid displaced by such movement will cause a small movement of the piston 135 relative to its associated cylinder 134, which movement will be readily accommodated by the resilient connection that includes spring 143 between said cylinder and the tractor. In this manner since the largest amount of movement of the cylinder unit 79 relative to the tractor will be effected while there is a very limited amount of movement of the cylinder 134 relative to the piston 135 taking place for practical purposes this action may be considered as having the piston 135 and cylinder 134 acting as a rigid thrust member while forcing a compression of spring 143. Then by momentarily moving the lever 111, of control valve 86, to the lift position and then back into the drop position the pre-set depth can be regained. It will be understood, of course, that the spring 163, in metering cylinder 83, will be somewhat less reactive than the spring 143, associated with cylinder 79, so as to permit the overriding action to take place only after the pre-set stop depth has been attained.

Upon the completion of each lift stroke of the depth transmitting cylinder 79 any oil leakage from the system is replenished with fluid received through the feeder check-valve 164 in the piston of said cylinder. The area of said cylinder adjoining the spring 163 will usually contain a supply of fluid received from the control valve 86 through passage 104, port passage 95 and conduit 94 under very low pressure and hence appropriate replenishment can be readily effected from this supply as needed during each lift stroke. Since this fluid is under relatively low pressure it will be appreciated that the reactive force of spring 170 in said check valve may readily be set to restrict passage of fluid therethrough except when the pressure differential on the opposite sides thereof is such as to permit overcoming this reaction. This condition may obtain, of course, when there has been leakage in the depth transmitting system and the system requires replenishment.

It is believed that the operation of the proposed depth control apparatus, as utilized in association with the specific implement attaching mechanisms, will be clearly understood from the foregoing description. It should likewise be understood, however, that the invention has been described in a preferred embodiment and application only and that modifications may be made in the invention without departing from the spirit thereof or the scope of the appended claims.

What is claimed is:

1. In a fluid pressure system for controlling the elevation of a tool of which the elevation is adjustable with respect to a mobile frame, a draft structure carrying the tool and adapted for pivotal mounting on the mobile frame, lift arms pivotally mounted on the frame and operatively connected to said draft structure, a source of hydraulic pressure, a hydraulic ram operably connected between the frame and the lift arms for changing the elevation of the tool when the ram is subjected to hydraulic pressure from said source, a control valve interposed between said source and the ram and having a movable element therein slidably operative for conditioning said valve into its opened, closed and neutral positions and operative for controlling the flow of hydraulic pressure from said source to said ram, said valve containing a fluid-receiving section having a piston member reciprocable therewithin which piston is operative when said section is subjected to fluid pressure in excess of a predetermined value for operatively engaging said movable element for restoring the valve from a set position wherein communication is established thereby between the source and the ram to a neutral position terminating communication between the source and ram, a fluid-containing control circuit communicating with the fluid-receiving section of said valve and having intercommunicative chambers respectively variable in fluid capacity, one of said chambers containing a capacity-changing element positively connected for movement with the ram and operable thereby to diminish the capacity of such chamber attendant the operation of the ram for moving the tool in a downward direction, the other of such hydraulic control circuit chambers having an element manually settable to selectively vary the capacity of such latter chamber for predetermining the amount of ram operation necessary in a downward direction to create hydraulic pressure in such control circuit which is effective to impose said pressure upon the piston member of the fluid-receiving section of said valve for restoring the valve to a neutral position.

2. Implement attaching apparatus for connecting an implement to a tractor vehicle, comprising: draft structure for carrying an implement and adapted for pivotal mounting on a tractor; lift arms pivotally mounted on the tractor and operatively connected to said draft structure; a source of hydraulic pressure; hydraulic ram operatively connected between the tractor and said lift arms for raising and lowering said draft structure when the ram is subjected to hydraulic pressure from said source; a control valve connected between said source and said ram and having a movable element therein slidably operative for conditioning said valve into its opened, closed and neutral positions and manually operative for controlling the flow of hydraulic pressure from said source to said ram, said valve being fashioned with a fluid-receiving section having a piston member reciprocable therewithin which piston is operative when said section is subjected to fluid pressure in excess of a predetermined value for operatively engaging said movable element for restoring said valve from a set position wherein communication is established thereby between the source and the ram to a neutral position terminating communication between said source and said ram; a fluid-containing control circuit communicating with the fluid-receiving section of said valve and having a sensing mechanism and a pre-settable stop device therein; said sensing mechanism being positively and operatively connected with said lift arms for movement therewith and being operable for sensing the lowering movements of said draft structure; said pre-settable stop device being operable between predetermined limits responsive to the receipt of fluid attendant the operation of said sensing mechanism for building up pressure therein and in said control circuit that is effective for operating said control valve and restoring it to a neutral position whereby further lowering movement of said draft structure is limited.

3. Implement attaching apparatus for connecting an implement to a tractor vehicle, comprising: draft structure for carrying an implement and adapted for pivotal mounting on a tractor; lift arms pivotally mounted on the tractor and operatively connected to said draft structure; a source of hydraulic pressure; a hydraulic ram operatively connected between the tractor and said lift arms for raising and lowering said draft structure when the ram is subjected to hydraulic pressure from said source; a normally manually operative control valve connected between said source and said ram and having a movable element therein slidably operative for conditioning said valve into its opened, closed and neutral positions and operative for controlling the flow of hydraulic pressure from said source to said ram, said valve being fashioned with a fluid-receiving section having a piston member reciprocable therewithin which piston is operative when said section is subjected to fluid pressure in excess of a predetermined value for operatively engaging said movable element for restoring said valve from a set position wherein communication is established thereby between the source and the ram to a neutral position terminating communication between said source and said ram; a fluid-containing control circuit communicating with the fluid-receiving section of said control valve and having a sensing mechanism and a pre-settable stop device therein; said sensing mechanism being positively and operatively connected between said lift arms and the tractor and operable responsive to the movement of said lift arms for sensing the lowering movements of said draft structure; said pre-settable stop device being operable between predetermined limits responsive to the reception of fluid therein attendant the operation of said sensing mechanism for building up pressure therein and in said control circuit that is effective for operating the piston member of said control valve for engaging said movable element thereof and thereupon restoring said valve to a neutral position and thereby normally limiting further lowering movement of said draft structure; said sensing mechanism being provided with resilient connecting means interposed between said mechanism and its connection with the tractor that is reactively operative when said control valve is momentarily manually operated to lower the draft structure following operation and restoration to a neutral position of said valve by the control circuit for accommodating displacement of fluid from said fluid-receiving section by permitting limited relative movement between said sensing mechanism and said lift arms while concurrently permitting a greater degree of relative movement between said sensing mechanism and the tractor.

4. Implement attaching apparatus for connecting an implement to a tractor vehicle, comprising: draft structure for carrying an implement and adapted for pivotal mounting on a tractor; lift arms pivotally mounted on the tractor and operatively connected to said draft structure; a source of hydraulic pressure; a hydraulic ram operatively connected between the tractor and said lift arms for raising and lowering said draft structure when the ram is subjected to hydraulic pressure from said source; a normally manually operative control valve connected between said source and said ram and having a movable element therein slidably operative for conditioning said valve into its opened, closed and neutral positions and operative for controlling the flow of hydraulic pressure from said source to said ram, said valve being fashioned with a fluid-receiving section having a piston member reciprocable therewithin which piston is operative when said section is subjected to fluid pressure in excess of a predetermined value for operatively engaging said movable element for restoring said valve from a set position wherein communication is established thereby between the source and the ram to a neutral position terminating communication between said source and said ram; a hydraulic cylinder unit with a piston reciprocally disposed therein and having said piston positively connected to one of said lift arms for movement therewith while said cylinder is resiliently connected to the tractor to accommodate relative movement between the cylinder and the tractor; fluid metering means manually selectively operable between predetermined limits; conduits having a pressure-transmitting fluid therein connecting said hydraulic cylinder unit with said fluid metering means and with said fluid-receiving section of said control valve and connecting said fluid metering means with said control valve; said hydraulic cylinder unit being operable responsive to the movement of said lift arms in a downward direction for creating a hydraulic pressure transmittable by way of said conduits to said fluid metering means for operating said last named means and to said fluid-receiving section of said control valve and which pressure when the selected limit of said fluid metering means has been attained becomes effective to operate the piston member of said valve for engaging said movable element thereof and thereby condition said valve to discontinue the flow of hydraulic pressure from said source to said ram; and having the resilient connection between said cylinder unit and the tractor reactively operative when said control valve is momentarily manually operated to move the lift arms in a downward direction subsequent to operation and restoration to a neutral position of said control valve by the pressure in said conduits for accommodating displacement of fluid from said fluid-receiving section by permitting limited relative movement between said cylinder unit and said lift arms while concurrently permitting a greater degree of relative movement between said cylinder unit and the tractor.

5. Implement attaching apparatus for connecting an implement to a tractor vehicle, comprising: draft structure for carrying an implement and adapted for pivotal mounting on a tractor; lift arms pivotally mounted on the tractor and operatively connected to the draft structure; hydraulic lift means including a hydraulic motor, a source of fluid, a source of hydraulic pressure, a control valve, and interconnecting conduits, and having the hydraulic motor thereof connected between said lift arms and the tractor for swinging the lift arms and raising and lowering the draft structure responsive to the operation of said control valve; a hydraulic ram unit positively and operably connected between said lift arms and the tractor; fluid metering means manually selectively operable between predetermined limits; conduits having pressure-transmitting fluid therein connecting said ram unit with said fluid metering unit and with said control valve, and additional conduits connecting said fluid metering means with said fluid source; said hydraulic ram unit being operable responsive to the downward movement of said lift arms for creating a pressure transmittable in said first conduits to said metering means for operating said latter means and to said control valve and which pressure when the selected limit of said metering means is attained becomes effective to operate said control valve and limit further downward movement of said lift arms; and fluid replenishing means connectable between said first named conduits and said fluid source and operative to replenish the fluid in said first named conduits with fluid from said source, including a uni-directional flow valve normally biased to a closed position and disposed in said metering means and operative to permit the passage of fluid therethrough when the pressure in said additional conduits is sufficiently in excess of that in said first named conduits to overcome said bias and condition said latter valve for the passage of fluid therethrough.

6. In a fluid pressure system for controlling the elevation of a tool of which the elevation is adjustable with respect to a mobile frame, a draft structure carrying the tool and adapted for pivotal mounting on the mobile frame, lift arm pivotally mounted on the frame and operatively connected to said draft structure, a source of hydraulic pressure, a hydraulic ram operably connected between the frame and the lift arms for changing the elevation of the tool when the ram is subjected to hydraulic pressure from said source, a control valve interposed between said source and the ram and having a movable element therein slidably operative for conditioning said valve into any one of a plurality of positions, said valve containing a fluid-receiving section having a piston member reciprocable therewithin which piston member is operative when said section is subjected to fluid pressure in excess of a predetermined value for operatively engaging the movable element thereof for restoring the valve from a set position wherein communication is established thereby between the source and the ram to a neutral position terminating communication between the source and ram, a second hydraulic ram operably connected between the frame and the lift arms for movement with said tool with respect to the frame and operative to create a pressure therewithin when the tool moves in a downward direction, a hydraulic cylinder having a piston mounted for reciprocal movement therewithin between predetermined limits and an adjustable stop engageable with said piston in any one of a plurality of pre-settable positions to limit the movement of said piston in one direction and having means reactive between said piston and one end of the cylinder biasing the piston toward the opposite end of said cylinder, conduits having pressure-transmitting fluid therein connecting said second hydraulic ram with the fluid-receiving section of said control valve and with said cylinder, said second hydraulic ram being operable responsive to the downward movement of the tool for building up a pressure transmittable by way of said conduits to said cylinder for moving the piston therein to engage the pre-set stop and to the fluid-receiving section of said control valve and which pressure when the pre-set limit of said stop has been attained becomes effective to operate the piston in said valve and restore said control valve to a neutral position.

References Cited in the file of this patent

UNITED STATES PATENTS

| | | |
|---|---|---|
| 2,385,351 | Davidsen | Sept. 25, 1945 |
| 2,482,249 | Court | Sept. 20, 1949 |
| 2,524,055 | Hubert | Oct. 3, 1950 |
| 2,547,552 | Anderson | Apr. 3, 1951 |
| 2,610,614 | Sedgwick | Sept. 16, 1952 |
| 2,821,173 | Adsit | Jan. 28, 1958 |